Figure 1:
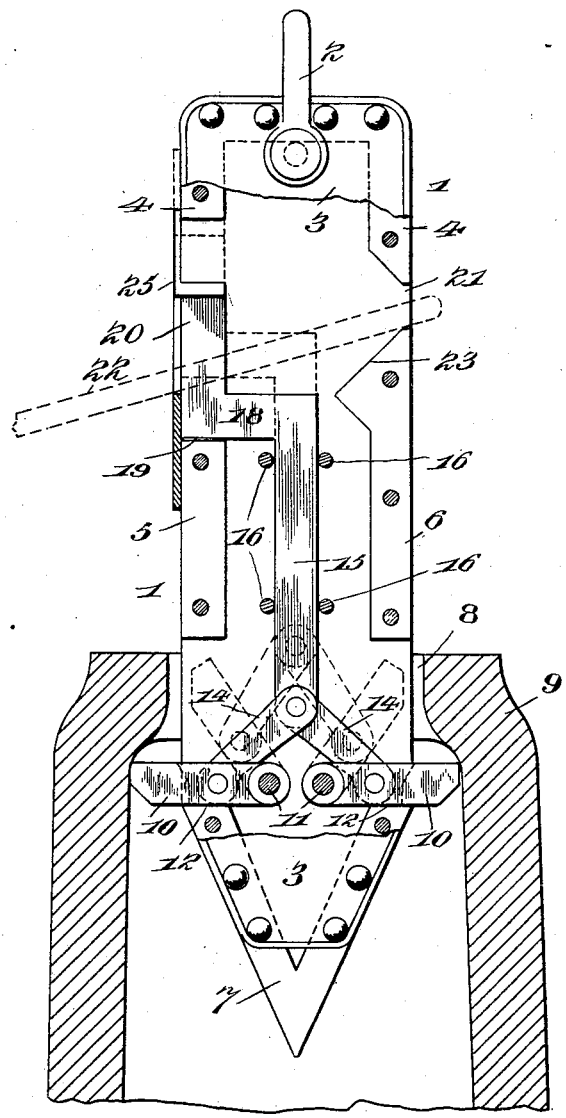

No. 735,616. PATENTED AUG. 4, 1903.
L. G. STITT.
INGOT MOLD DOG OR GRAPPLE.
APPLICATION FILED MAR. 18, 1903.
NO MODEL.

Witnesses.

Inventor.
Levi G. Stitt
By Kay & Totten
Attorneys.

No. 735,616. Patented August 4, 1903.

UNITED STATES PATENT OFFICE.

LEVI G. STITT, OF VANDERGRIFT, PENNSYLVANIA.

INGOT-MOLD DOG OR GRAPPLE.

SPECIFICATION forming part of Letters Patent No. 735,616, dated August 4, 1903.

Application filed March 18, 1903. Serial No. 148,425. (No model.)

*To all whom it may concern:*

Be it known that I, LEVI G. STITT, a resident of Vandergrift, in the county of Westmoreland and State of Pennsylvania, have invented a new and useful Improvement in Ingot-Mold Dogs or Grapples; and I do hereby declare the following to be a full, clear, and exact description thereof.

My invention relates to a tool or device for handling ingot-molds or other similar articles; and the object of my invention is to provide a device of this kind whereby one or more workmen heretofore required can be dispensed with, whereby the handling of hot molds is greatly facilitated, and whereby the molds can be piled much closer together than heretofore, thus economizing floor-space.

Ingot-molds have heretofore been handled by engaging lugs on the molds by hooks or links on the crane, by which said molds are lifted and carried from place to place. It requires one or more workmen to engage the crane-hooks with the lugs of the mold, and as the molds are usually red-hot it is difficult to handle them by reason of the intense heat, which prevents the near approach of the workmen in order to engage and disengage the crane-hooks with the lugs of the mold. Furthermore, the crane-hooks engage the molds on the outside thereof, so that some space must be left between the molds when placed upon the floor in order to permit the engagement and disengagement of the crane-hooks.

The object of my invention is to provide means for handling ingot-molds and similar articles whereby the foregoing difficulties are overcome and whereby the workmen heretofore necessary for placing the crane-hooks on the lugs of the mold can be dispensed with, whereby red-hot molds can be easily handled and without inconvenience to any of the workmen, and whereby the molds can be set much closer together than heretofore, thus economizing floor-space.

To these ends my invention comprises, generally stated, a suitable dog or grapple provided with movable lugs or fingers which will permit the insertion of the device through the neck of the mold and will then automatically engage the latter on the inside, thus enabling the molds to be piled close together on the floor and also dispensing with the workmen heretofore necessary for placing the crane-hooks on the mold-lugs, the entire operation of engaging, lifting, and carrying the mold being done entirely by the crane operator.

In carrying out the invention I provide a frame or casing adapted for connection to a crane or other lifting mechanism and of a size to pass through the neck of the mold, which frame is provided with lugs or fingers so mounted in said frame as to normally project beyond the same, but being free to move within the outlines of the frame, so as to permit the device to pass through the neck of the mold and to then automatically move outward to engage the latter. I also provide means for withdrawing said lugs or fingers within the frame or casing to permit the disengagement of the device from the mold.

Figure 2:
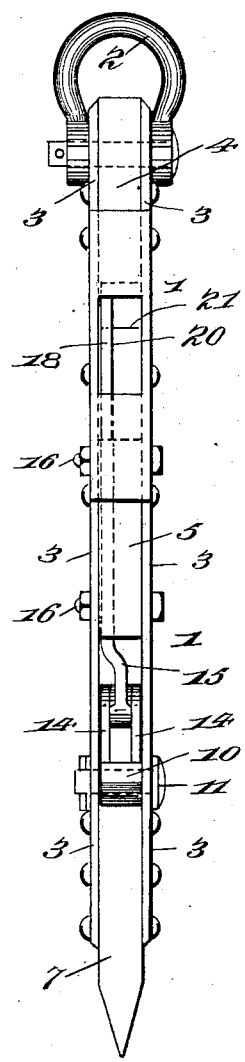

In the accompanying drawings, Figure 1 is a side view of my device, showing one of the face-plates partly broken away and the device engaging a mold. Fig. 2 is an edge view of the device.

My device is arranged to be suspended from the hook of a crane or lifting device of any kind and operated by any suitable power. It comprises a frame of suitable construction, preferably made as a casing, so as to house and protect the parts, and provided with a suitable clevis or link 2 for suspending it from the hook of the crane. The frame or casing 1 is composed of two plates 3, united by suitable blocks or spacing-pieces 4, 5, 6, and 7 and tapering to a point at its lower end, so as to easily enter the neck 8 of the mold 9. In this frame or casing are a pair of fingers 10, so mounted as to normally project outward beyond the casing, but capable of being withdrawn therein, such mounting preferably consisting in pivoting the inner ends of said fingers to the frame, as at 11. Normally these fingers will lie in a horizontal position, being free to swing upwardly, but being prevented from moving downwardly by suitable shoulders or stops, such as the upper ends 12 of the spacing or filling pieces 7. It will be at once apparent that by merely lowering the device through the neck of the mold the fingers 10 will swing upwardly within the casing, but as soon as the neck of the mold has been passed said fingers will swing by gravity to the horizontal position shown, so that when the device is raised by the crane the mold will be lifted. In this manner the mold can be engaged, lifted, and carried to any suitable destination without the attention of any person other than the crane operator, thus making it easy to handle red-hot molds. When the mold has been carried to its desired destination, it is necessary to disengage the lifting device therefrom. Means therefor are provided for withdrawing the fingers 10 within the frame or casing to permit the latter to be drawn out of the mold. Various means for this purpose can be employed, that shown in the drawings comprising a pair of links 14, one of which is connected to each of the fingers 10, and said links being in turn connected to the lower end of a slide-bar 15, suitably guided in the frame or casing 1, such as by the bolts or studs 16, and provided at its upper end with means whereby it can be engaged by a bar or the like and raised to retract the fingers 10. In the specific arrangement shown in the drawings the upper end of the slide-bar 15 is provided with a right-angled portion 18, extending through a slot or opening 19 in the edge of the casing. This right-angled portion is provided with a shoulder or opening 20, and opposite the same in the other edge of the casing is an opening 21, so that by inserting a bar to the portion indicated in dotted lines at 22 and then lifting up on the same the slide-bar 15 will be raised to the dotted-line position shown in Fig. 1, the opening 21 serving as a fulcrum for the bar. The spacing or filling piece 6 has its upper end beveled, as at 23, and projecting inwardly, so that by merely thrusting the bar 22 into the casing its end will be guided up into the opening 21. To the outer end of the part 18 of the slide-bar is secured a plate 25, which covers the opening 19 in the edge of the casing to conceal the same.

In use the device is suspended by the clevis 2 from the hook of a crane or other lifting device. The crane operator will bring the device over the mold to be lifted and will then lower the same down into said mold, said device being guided into the mold-neck by its projecting point and the fingers 10 automatically moving within the frame or casing; but as soon as they have passed below the neck of the mold they automatically move outwardly to the horizontal position indicated. Then the crane operator by merely raising the crane-hook lifts the mold and can carry it to any suitable destination. Here the mold will be lowered, and the workman whose duty it is to see that it is in proper position will thrust a small bar through the openings 19 and 21 in the sides of the casing and through the hole 20 in the upper part of the slide-bar 15. Then by a slight upward movement of the bar, which is fulcrumed in the opening 21, the slide-bar 15 will be moved upwardly, thus causing the fingers 10 to be withdrawn within the casing 1. The device can then be withdrawn from the mold, and when this is accomplished the bar 22 is withdrawn and the fingers 10 will again drop to the horizontal position and be ready for the next operation.

It will be observed that the device engages the mold entirely on the inside and that this engagement is effected automatically. As a consequence red-hot molds can be conveniently handled, as the workmen heretofore necessary for placing the crane-hooks on the mold-lugs can be entirely dispensed with. Furthermore, in placing the molds in position practically no space need be left between them for the reason that there are no mold-engaging means on the outside of the mold. This enables the molds to be placed very close together to economize floor-space.

It will be obvious that various changes may be made in the specific construction of my device. For instance, it is not necessary that the fingers 10 be pivoted in the casing, as they can be otherwise mounted so that they can be withdrawn within the casing and will automatically move down to project beyond the outer face of the casing. Furthermore, various means other than the slide-bar 15 may be employed for withdrawing the fingers in the casing.

What I claim as my invention, and desire to secure by Letters Patent, is—

1. An ingot-mold-lifting device comprising a frame or casing adapted for connection to a crane or other lifting mechanism and provided with a guiding projection at its lower end adapted to pass through the neck of the mold, and means on said frame or casing arranged to engage the interior of the mold and lift the same.

2. An ingot-mold-lifting device comprising a frame or casing adapted for connection to a crane or other lifting mechanism and adapted to pass through the neck of the mold, a finger or fingers mounted in said frame or casing and arranged to normally fall by gravity and project beyond the same, and means for withdrawing said finger or fingers into the frame or casing.

3. An ingot-mold-lifting device comprising a frame or casing adapted for connection to a crane or other lifting mechanism and adapted to pass through the neck of the mold, a pair of fingers pivoted in said frame and normally projecting beyond the same in a horizontal position and being free to swing upwardly, and means for causing said fingers to swing upwardly into the frame or casing.

4. An ingot-mold-lifting device comprising a frame or casing adapted for connection to a crane or other lifting mechanism and adapted to pass through the neck of the mold, a pair of fingers or the like mounted in said frame and arranged to normally project beyond the same, links connected to said fingers, and a slide-bar connected to said links and accessible from the outside of the frame to lift the same to withdraw the fingers into the frame or casing.

5. An ingot-mold-lifting device comprising a frame or casing adapted for connection to a crane or other lifting mechanism and adapted to pass through the neck of the mold, a pair of fingers or the like mounted in said frame or casing and arranged to normally project beyond the same, a slide projecting through a slot in said casing and connected to said fingers, and a cover-plate on said slide to conceal the slot in the casing.

6. An ingot-mold-lifting device comprising a frame or casing adapted for connection to a crane or other lifting mechanism and arranged to pass through the neck of the mold, a pair of fingers or the like mounted in said frame or casing and arranged to normally project beyond the same, a slide-bar connected to said fingers to withdraw the same into the casing and having an opening or shoulder at its upper end, and oppositely-arranged openings in the casing adapted for the insertion of a bar to engage said slide-bar for raising the latter.

7. An ingot-mold-lifting device comprising a casing composed of two oppositely-arranged plates with suitable spacing or filling pieces between them and tapering at their lower ends, a pair of fingers mounted in said casing and arranged to normally project beyond the same and rest upon the lower filling-pieces, and a slide-bar connected to said fingers for withdrawing the same, said slide-bar projecting through an opening in the edge of the casing and being provided with means for the engagement of a lifting-bar therewith.

In testimony whereof I, the said LEVI G. STITT, have hereunto set my hand.

LEVI G. STITT.

Witnesses:
S. A. DAVIS,
M. E. UNCAPHER.